United States Patent [19]
Sato et al.

[11] Patent Number: 5,298,916
[45] Date of Patent: Mar. 29, 1994

[54] CONTROL BALL ASSEMBLY FOR A COORDINATE INPUT DEVICE

[75] Inventors: Tadamitsu Sato; Yoshiaki Ootuki; Shinji Hirano, all of Iwaki, Japan

[73] Assignee: Alps Electric Co., Ltd., Tokyo, Japan

[21] Appl. No.: 842,279

[22] Filed: Feb. 26, 1992

[30] Foreign Application Priority Data

Mar. 5, 1991 [JP] Japan ............................ 3-18706[U]

[51] Int. Cl.⁵ .......................................... G09G 3/02
[52] U.S. Cl. .................................... 345/157; 345/167
[58] Field of Search .................. 340/706, 709, 710;
74/471 XY, 198, 209; 273/148 B, DIG. 28;
476/36, 65, 66; 267/108, 74, 160, 161, 164, 165

[56] References Cited

U.S. PATENT DOCUMENTS

| | | | |
|---|---|---|---|
| 3,269,190 | 8/1965 | Laman | 74/198 |
| 4,505,165 | 3/1985 | Wiczer | 74/471 XY |
| 4,520,355 | 5/1985 | Mitch | 340/706 |
| 4,533,830 | 8/1985 | Beauprey | 340/709 |
| 4,952,919 | 8/1990 | Nippoldt | 340/710 |

*Primary Examiner*—Alvin E. Oberley
*Assistant Examiner*—Chanh Nguyen
*Attorney, Agent, or Firm*—Guy W. Shoup; Patrick T. Bever

[57] ABSTRACT

A control ball assembly for a coordinate input device including a pair of orthogonal rotatable shafts contacting a control ball and which rotate in response to a rotation of the control ball. A spring having two arms, each arm connected to one end of one of the pair of shafts, presses the rotatable shafts inward against the control ball with an equal biasing force. A support member is provided to support the spring.

3 Claims, 3 Drawing Sheets

CONTROL BALL ASSEMBLY FOR A COORDINATE INPUT DEVICE

BACKGROUND OF THE INVENTION

The present invention relates to a coordinate input device for inputting, for example, positional coordinate data of a cursor in a display unit used in a personal computer or the like.

DESCRIPTION OF THE RELATED ART

As a king of a coordinate input device for inputting positional coordinate data of a cursor in a display unit, or graphic data, there is known one in which a display position of the cursor on a display screen is changed by the rotation of a spherical body, or a ball, thus permitting the cursor display position to be changed optionally.

In such coordinate input device, as shown in FIG. 3 and FIG. 4, a ball 1 is mounted rotatably about a central point thereof, and driven rollers 3X and 3Y, which are fixed onto rotatable shafts 2X and 2Y, respectively, are held in pressure contact with the surface of the ball 1 at two points in radial directions (hereinafter referred to as "X and Y directions in XY coordinate system") spaced at an angle of 90° from the central point of the ball. Disk-like choppers 4X and 4Y each having a plurality of slits of the same size formed at equal intervals throughout the whole outer periphery thereof are fixed onto end portions of the rotatable shafts 2X and 2Y, respectively. Further, photointerrupters 5X and 5Y each having two sets of light emitting elements which are LEDs and light sensing elements which are phototransistors, though not shown, are provided for the choppers 4X and 4Y, respectively. The photointerrupters 5X and 5Y are disposed with respect to the choppers 4X and 4Y so that the outer peripheral portion having slits of each of the choppers 4X and 4Y gets into the spacing between the light emitting elements and the light sensing elements. The choppers 4X, 4Y and the photointerrupters 5X, 5Y constitute optical encoders 6X and 6Y.

When the ball 1 is rotated in X direction with a fingertip, the rotatable shaft 2X is rotated by the driven roller 3X and hence the chopper 4X rotates, while when the ball 1 is rotated in Y direction, the rotatable shaft 2Y is rotated by the driven roller 3Y and hence the chopper 4Y rotates. When the ball 1 is rotated in directions different from X and Y directions, the rotatable shafts 2X and 2Y rotate in directions corresponding to those directions, thus causing rotation of the choppers 4X and 4Y. A supply voltage V is applied to the photointerrupters 5X and 5Y, whose light emitting elements therefore are normally luminous. As the chopper 4X and 4Y rotate as mentioned above, light shielding portions each between adjacent slits formed in the outer peripheries of the choppers pass successively between the light emitting elements and light sensing elements of the photointerrupters 5X and 5Y, whereby the light travelling from each light emitting element to the associated light sensing element is chopped, so that the output of the light sensing element changes in level and becomes an output pulse of the optical encoder 6X or 6Y.

From the photointerrupter 5X are outputted two pulses generated in the two light sensing elements and different in phase from each other, which pulses are phase A pulse $P_{XA}$ and phase B pulse $P_{XB}$. Also from the photointerrupter 5Y are outputted phase A pulse $P_{YA}$ and phase B pulse $P_{YB}$ different in phase from each other. A phase relation between phase A and B pulses $P_{XA}$, $P_{XB}$ and that between phase A and B pulses $P_{YA}$, $P_{YB}$ differ according to rotational directions of the choppers 4X and 4Y, respectively. Such phase relations are usually set at 90°. For example, if in the X coordinate system the rotation in X direction in FIG. 4 is assumed to be a forward rotation and the rotation in the reverse direction is assumed to be a reverse rotation, then when the phase B pulse $P_{XB}$ advances 90° relative to the phase A pulse $P_{XA}$ in the forward rotation, the pulse $P_{XB}$ lags 90° relative to the pulse $P_{XA}$ in the reverse rotation. This is also the case with the phase A and B pulses $P_{YA}$, $P_{YB}$. A rotational direction of the ball 1 can be judged on the basis of such phase relation of phase A and B pulses, whereby it is made possible to determine a moving direction of the cursor on the display screen.

Leading and trailing edges of each of the phase A and B pulses $P_{XA}$, $P_{XB}$ which are outputted from the optical encoder 6X, are counted. In this case, a counting direction (up count or down count) is determined in accordance with a phase relation between the pulses $P_{XA}$ and $P_{XB}$. Then on the basis of this count value there is formed, for example, a lateral coordinate data of the cursor on the display screen. Likewise, on the basis of phase A and B pulses $P_{YA}$, $P_{YB}$ which are outputted from the optical encoder 6Y there is formed, for example, a longitudinal coordinate data of the cursor on the display screen.

In such coordinate input device, driven rollers 3X and 3Y are fixed onto the rotatable shafts 2X and 2Y, respectively, to transfer the rotation of the ball 1 to those shafts, and are held in pressure contact with the surface of the ball by a pressing means This pressing means is provided for each of the driven rollers 3X and 3Y, as shown in FIG. 4 . More specifically, as shown in the same figure, a housing 7X is provided near a front end of the rotatable shaft 2X, and a spring mounting member 8X is mounted on the front end portion of the shaft 2X so as to permit the rotation of the shaft. Further, a compression spring 9X is mounted between the housing 7X and the spring mounting member 8X. By virtue of the compression spring 9X, the rotatable shaft 2X is urged in the direction of arrow FX and the driven roller 3X is thereby pushed against the surface of the ball 1. Likewise, a spring mounting member 7Y is mounted on a front end portion of the rotatable shaft 2Y so as to permit the rotation of the shaft, and a compression spring 9Y is mounted between a housing 7Y and the spring mounting member 8Y. And by virtue of the compression spring 9Y, the rotatable shaft 2Y is urged in the direction of arrow FY and the driven roller 3Y is thereby pushed against the surface of the ball 1.

As to such coordinate input device wherein the ball is rotated with a fingertip, the reduction in size has been promoted so that the coordinate input device can be provided fixedly on a keyboard device, as shown in FIG. 5. This is very convenient because, since the coordinate input device is held in a certain constant position on the keyboard device, it is easier for the user to operate the coordinate input device at the time of keyboard operation and it is not necessary to give consideration about the custody of the coordinate input device after use.

However, the above conventional coordinate input device involves the following problems.

(1) As shown in FIG. 4, a pressing means for the ball 1 is provided for each of the driven rollers 3X and 3Y; besides, these pressing means are positioned on the side opposite to the ball with respect to the rotatable shafts 2X and 2Y. Thus, the spaces to be used exclusively for those pressing means are required although a pressing means is essential to a coordinate input device. With the reduction in size of the ball 1, rotatable shafts 2X, 2Y and driven rollers 3X, 3Y, it becomes possible to reduce such spaces, but the spaces in question still remain present as one factor in determining the size of the coordinate input device. Consequently, the reduction in size of the coordinate input device is restricted by the presence of such spaces. As a result, the position of the coordinate input device on the keyboard device is restricted, thus making it impossible to attain a satisfactory operability.

(2) Urging forces FX and FY applied to the rotatable shafts 2X and 2Y by the compression springs 9X and 9Y differ greatly due to, for example, variations in the biasing forces of the compression springs 9X and 9Y or mounting errors of those compression springs caused by disagreement in the distance between the housing 7X and the spring mounting member 8X and between the housing 7Y and the spring mounting member 8Y.

In FIG. 4, if a straight line passing though a central point 0 of the ball 1 and perpendicular to the rotatable shaft 2X, which straight line passes through the contact surface of the driven roller 3X on the surface of the ball, is assumed to be central axis 0X, and a straight line passing through the central point 0 of the ball and perpendicular to the rotatable shaft 2Y, which straight line passes through the contact surface of the drive roller 3Y on the surface of the ball 1, is assumed to be a central axis 0Y, it is necessary for the rotatable shaft 2Y to rotate when the ball 1 rotates about the central axis 0X and for the rotatable shaft 2X to rotate when the ball rotates about the central axis 0Y. For these rotations it is necessary that a frictional force be created between the ball 1 and the driven rollers 3X, 3Y. To this end, the driven rollers 3X and 3Y are usually formed of hard rubber and are pushed against the surface of the ball by means of the compression springs 9X and 9Y.

On the other hand, in order to prevent rotation of the rotatable shaft 2X when the ball 1 rotates about the central axis 0X and prevent rotation of the rotatable shaft 2Y when the ball rotates about the central axis 0Y, the shafts 2X and 2Y are disposed in such a manner that the central axes 0X and 0Y are orthogonal to each other. In this case, the ball 1 slips on the surface of the driven roller 3X or 3Y.

As mentioned above, however, since frictional forces are generated between the ball 1 and the driven roller 3X, 3Y by the biasing forces of the compression springs 9X and 9Y, the ball slips while friction is induced between it and the driven rollers 3X, 3Y, so that an additional load is imposed on the ball. In this case, if there is a difference between the biasing forces of the compression springs 9X and 9Y, there is developed a difference between the frictional force between the ball 1 and the driven roller 3X and the frictional force between the ball and the driven roller 3Y, resulting in that the load applied to the ball 1 differs between the case where the ball is rotated about the central axis 0X and the case where it is rotated about the central axis 0Y.

When the ball 1 is rotated about a central axis present on a plane including the central axes 0X, 0Y and passing through the central point 0, this rotation of the ball can be regarded as being a vectorial sum of two rotating components around the central axes 0X and 0Y. Consequently, the load imposed on the ball 1 differs depending on such central axis, that is, depending on the rotational direction of the ball.

Thus, the user feels heavy or light, namely a sense of incongruity, in rotating the ball 1 according to rotating directions of the ball. Further, when the moving direction of the cursor is changed by changing the rotating direction of the ball 1, the load imposed on the ball 1 will be changed during rotation of the ball, thus making it very difficult to attain a smooth rotation of the ball.

(3) In order that the ball 1 may rotate smoothly about the central point 0 without abutment with a ball supporting member, there is provided a clearance between the ball and the support member. As a result, however, the ball 1 wobbles during the rotation thereof. If this wobbling of the ball 1 causes a displacement of the ball along the central axis 0X, the frictional force between the ball and the driven roller 3X changes, and if the ball 1 is displaced along the central axis 0Y, the frictional force between the ball and the driven roller 3Y changes. Thus, even such wobbling of the ball 1 causes a variation in the load applied thereto and a smooth rotation of the ball is thereby impeded.

SUMMARY OF THE INVENTION

It is the object of the present invention to solve the above-mentioned problems and provide a coordinate input device of a reduced size capable of being operated smoothly.

According to the present invention, in order to achieve the above-mentioned object, there is used a coiled spring having two arms whose urging directions are opposite to each other, and an end portion of one rotatable shaft is urged to a spherical body side by one of the arms, while an end portion of another rotatable shaft is urged to the spherical body side by the other arm.

Since two rotatable shafts are urged by a single coiled spring, the urging forces applied to the rotatable shafts are always equal to each other, and a load applied to the spherical body, or a ball, by pressure contact of driven rollers mounted on the rotatable shafts with the ball is kept constant irrespective of a rotating direction of the ball, whereby the rotation of the ball is kept smooth no matter in which direction the ball may be rotated.

Further, since the coiled spring as the pressing means is used in common to both rotatable shafts, the space required for the pressing means is smaller than that in the conventional coordinate input device using two pressing means. Additionally, the structure of the coiled spring permits the spring to be disposed near front ends of the two rotatable shafts and hence the space for the coiled spring is no longer a factor for determining the size of the coordinate input device.

DESCRIPTION OF THE PREFERRED EMBODIMENT

An embodiment of the present invention will be described below with reference to the accompanying drawings.

Figure 1:
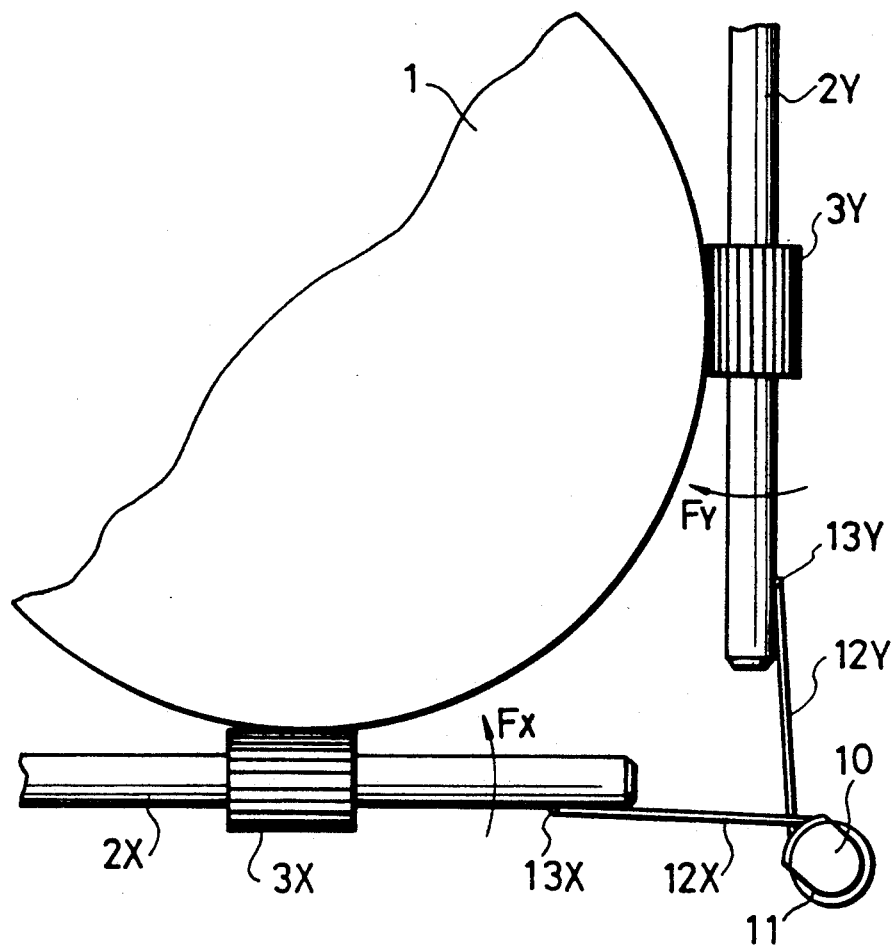
FIG. 1 is a plan view showing a principal portion of a coordinate input device according to an embodiment of the present invention.
Figure 4:
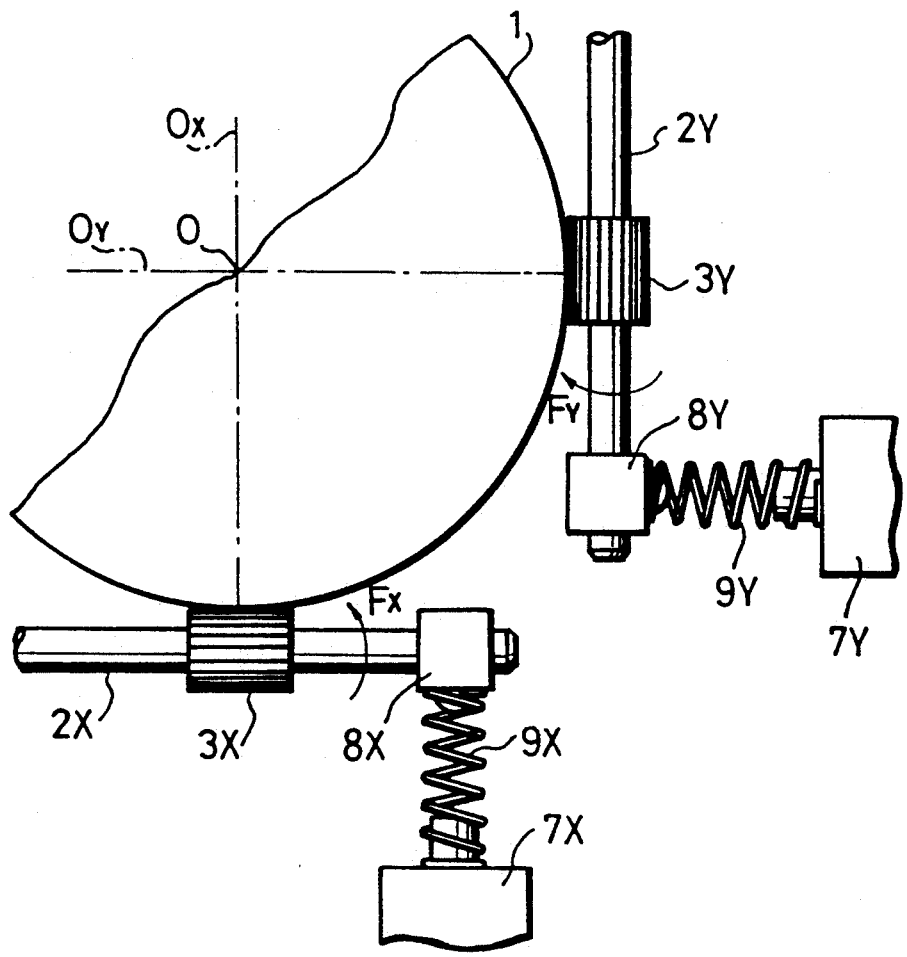
FIG. 4 is a plan view showing a principal portion of a conventional coordinate input device.
Figure 5:
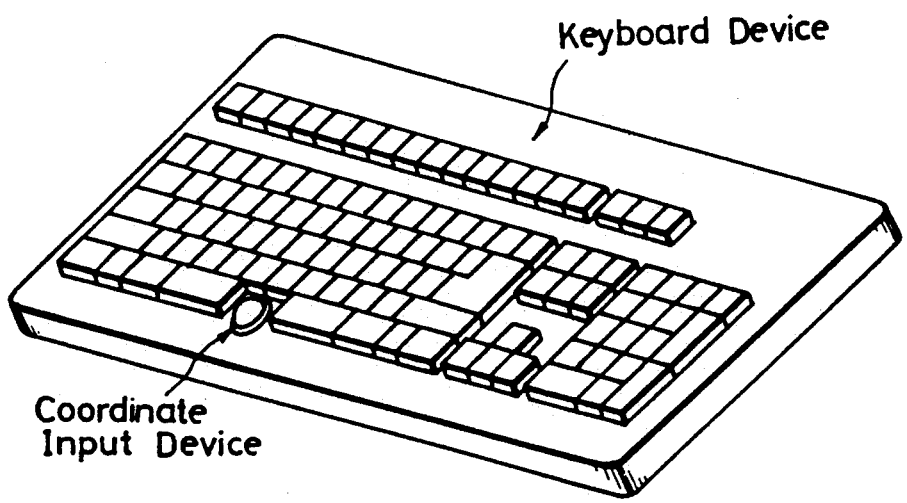
FIG. 5 is a perspective view showing a mounting example of the coordinate input device on a keyboard.

FIG. 1 is a plan view showing a principal portion of a coordinate input device according to an embodiment of the present invention, in which the reference numeral 10 denotes a support member, numeral 11 denotes a coiled spring, numerals 12X and 12Y each denote an arm, numerals 13X and 13Y each denote an abutment portion, and numeral 14 denotes a housing. The portions corresponding to those in FIG. 4 are indicated by the same reference numerals.

Figure 2:
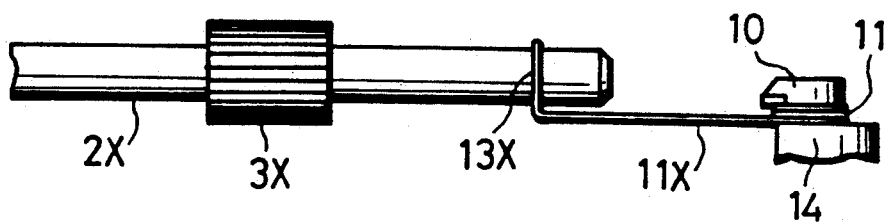
FIG. 2 is a side view thereof.
Figure 3:
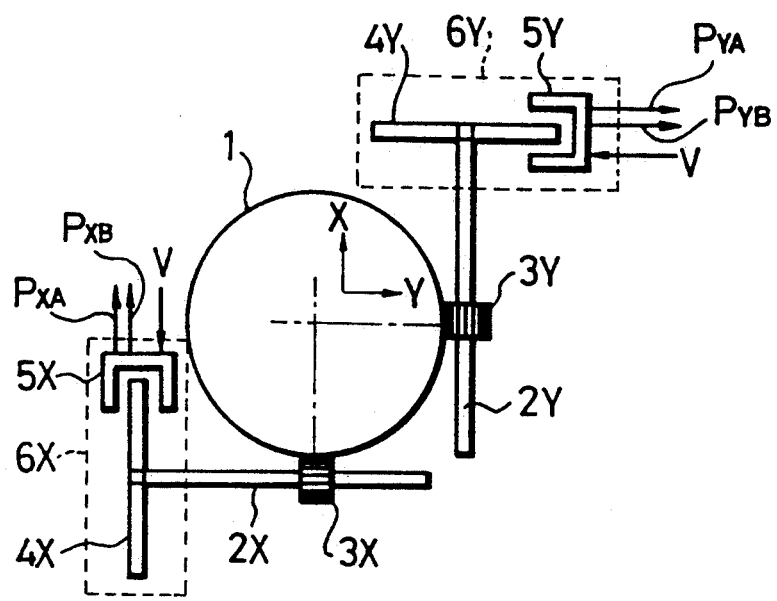
FIG. 3 is a plan view schematically showing an entire construction of a mechanical portion of the coordinate input device.

In FIGS. 1 and 2, a housing 14 provided with the support member 10 is disposed near an intersecting point of extension lines not shown of rotatable shafts 2X and 2Y. The coiled spring 11 is attached rotatably to the support member 10. Both ends of the coiled spring 11 are extended to form arms 12X and 12Y. When the coiled spring 11 is mounted to the support member 10, the arms 12X and 12Y are on a plane parallel to and below a plane which includes the rotatable shafts 2X and 2Y. It goes without saying that the arms 12X and 12Y are located in positions different in height. A front end portion of the arm 12X is bent perpendicularly thereto to form an abutment portion 13X and a front end portion of the arm 12Y is also bent perpendicularly thereto to form an abutment portion 13Y.

In the state shown in FIG. 1, the coiled spring 11 has a biasing force acting in a direction to narrow the angle between the arms 12X and 12Y. The coiled spring 11 is mounted to the support member 10, and the abutment portion 13X of the arm 12X is brought into abutment with the face of a front end portion of the rotatable shaft 2X on the side opposite to the ball 1, while the abutment portion 13X of the arm 12Y is brought into abutment with the face of a front end portion of the rotatable shaft 2Y on the side opposite to the ball 1, whereby the biasing force of the coiled spring 11 is exerted on the rotatable shafts 2X and 2Y, and the shaft 2X is thereby urged in the direction of arrow FX, while the shaft 2Y is urged in the direction of arrow FY, so that driven rollers 3X and 3Y are brought into pressure contact with the surface of the ball 1.

In the above construction, since the rotatable shafts 2X and 2Y are biased by the same coiled spring 11, the biasing forces exerted on both shafts are equal to each other. In the case where the ball 1 is displaced to the driven roller 3Y side due to wobbling thereof, the rotatable shaft 2Y is somewhat displaced rightwards in FIG. 1 to change the arms 12X and 12Y and the biasing force of the coiled spring 11 increases to increases the biasing forces applied to the rotatable shafts 2X and 2Y. But these biasing forces are also equal to each other. Thus, even in the event of wobbling of the ball 1, the urging force applied to the shafts 2X and 2Y are always equal to each other. Therefore, no matter in which direction the ball 1 may be rotated, the load imposed on the ball is approximately constant. The load imposed on the ball 1 changes little even when the rotating direction of the ball is changed. Consequently, the user can operate the ball 1 without a sense of incongruity and the rotation of the ball becomes smooth.

Further, since it is only one pressing means, i.e., coiled spring 11, that is required for pressing the driven rollers 3X and 3Y, the space necessary for the mounting of the pressing means is small, and it is a space which is inevitably provided near the front ends of the rotatable shaft 2X and 2Y. Therefore, it is not necessary to provide a special space for the pressing means and the provision of the pressing means does not serve as a factor for determining the size of the coordinate input means. Consequently, the space required for the pressing means in the conventional coordinate input device becomes almost zero equivalently; that is, the reduction in size of the coordinate input device can be attained.

According to the present invention, as set forth above, it is possible to eliminate a change in the load which is applied to a ball according to a rotating direction of the ball, whereby the rotation of the ball can be done smoothly and it is possible to realize a great reduction in size of the coordinate input device.

We claim:

1. A control ball assembly for a coordinate input device, comprising:
    a control ball rotatably disposed in the coordinate input device;
    a first shaft rotatably disposed in the coordinate input device, said first shaft contacting said control ball;
    a second shaft rotatably disposed in the coordinate input device, said second shaft contacting said control ball; and
    a spring connected to the first shaft and the second shaft, said spring biasing both of said first and second shafts against said control ball with forces having an equal magnitude.

2. A control ball assembly for a coordinate input device, comprising:
    a control ball rotatably disposed in the coordinate input device;
    a first shaft rotatably disposed in the coordinate input device, said first shaft contacting said control ball;
    a second shaft rotatably disposed in the coordinate input device, said second shaft contacting said control ball; and
    a resilient member connected to the first shaft and the second shaft, said resilient member biasing both of said first and second shafts against said control ball with forces having an equal magnitude;
    wherein said first and second shafts are orthogonally disposed in said resilient member is a coiled spring having a first arm connected to an end of the first shaft and a second arm connected to an end of the second shaft.

3. The control ball assembly of claim 1 further comprising support means disposed on the coordinate input device for rotatably supporting the spring.

* * * * *